United States Patent [19]

Hill, Jr. et al.

[11] Patent Number: 4,698,411

[45] Date of Patent: Oct. 6, 1987

[54] POLYESTER RESINS

[75] Inventors: H. Wayne Hill, Jr., Bartlesville, Okla.; Michael D. Cliffton, Omaha, Nebr.

[73] Assignee: Phillips Petroleum Company, Bartlesville, Okla.

[21] Appl. No.: 857,271

[22] Filed: Apr. 30, 1986

[51] Int. Cl.$^4$ .................... C08G 63/52; C08G 63/76
[52] U.S. Cl. .................... 528/303; 525/10; 525/40; 528/306
[58] Field of Search .............. 525/40, 10, 33, 34, 525/35, 36, 37, 38, 39; 528/303, 306

[56] References Cited

U.S. PATENT DOCUMENTS

| | | | |
|---|---|---|---|
| 3,109,831 | 11/1963 | Seiner | 260/75 |
| 3,391,223 | 7/1968 | DiLeone | 525/33 |
| 3,391,223 | 7/1968 | DiLeone | 260/871 |
| 3,465,061 | 9/1969 | Fekete et al. | 260/865 |
| 3,615,979 | 10/1971 | Davis et al. | 156/87 |
| 3,911,048 | 10/1975 | Varglu et al. | 260/861 |
| 4,071,578 | 1/1978 | Lasher | 260/850 |
| 4,122,073 | 10/1978 | Georgoudis | 260/860 |
| 4,269,745 | 5/1981 | Neumann | 260/23 P |
| 4,298,711 | 11/1981 | Moulson et al. | 525/40 |
| 4,299,927 | 11/1981 | Dombroski | 525/64 |
| 4,311,814 | 1/1982 | Ochsenbein | 525/438 |
| 4,480,087 | 10/1984 | Trotter et al. | 528/302 |
| 4,499,235 | 2/1985 | Verwer et al. | 525/38 |
| 4,533,723 | 8/1985 | Weitemeyer | 528/303 |
| 4,546,142 | 10/1985 | Walewski | 524/487 |

*Primary Examiner*—Lucille M. Phynes
*Attorney, Agent, or Firm*—A. W. Umphlett

[57] ABSTRACT

An unsaturated polyester resin syrup containing styrene monomer in which styrene volatilization is suppressed using a substituted succinic acid or substituted succinic anhydride.

20 Claims, No Drawings

POLYESTER RESINS

BACKGROUND OF THE INVENTION

The present invention relates to unsaturated polyester resin compositions. In one of its aspects it relates to processes for making unsaturated polyester resin compositions. In still another aspect this invention relates to controlling the volatilization of the styrene ingredients utilized in unsaturated polyester resin compositions.

Unsaturated polyester resins are a class of soluble, essentially linear, low molecular weight, macromolecules which contain both carboxylic ester groups and carbon carbon double bonds as recurring units along the main chain. Unsaturated polyesters can be prepared by the condensation of (a) ethylenically unsaturated dicarboxylic acids or their anhydrides to impart unsaturation, (b) saturated dicarboxylic acids or their anhydrides to modify the unsaturated polyesters and (c) dihydric alcohols.

Unsaturated polyester resin compositions can include monomeric styrene as a copolymerizable monomer. A solution of monomeric styrene and unsaturated polyester resin is frequently identified as polyester resin syrup. Styrene customarily is present in an amount ranging from about 20 to about 50 weight percent of the syrup. When polyester resin syrup is employed in hand layup or spray applications to produce glass fiber reinforced plastic products and the like, styrene monomer in the syrup has a the tendency to volatilize. Volatilization of the styrene is objectable for several reasons: among others (1) the cost of the lost styrene is appreciable, (2) the variable loss of styrene from day to day and batch to batch can result in non-uniform product performance, and the presence of styrene vapors in the atmosphere at the work place constitutes both a health hazard to workers and a fire hazard.

There exists a need, therefore, to provide compositions of polymerizable unsaturated polyester resin including monomeric styrene in which the volatilization of styrene is successfully suppressed to acceptable levels without adversely affecting the characteristics of the resulting products.

An object of this invention is to provide an unsaturated polyester resin that reduces the volatilization of styrene. Another object of this invention is to reduce the overall resin costs or to improve physical and mechanical properties of the polyester, preferably both.

SUMMARY OF THE INVENTION

In accordance with the present invention, an inexpensive substitute for the saturated dicarboxylic acid component of unsaturated polyester resin has been found by utilizing alkyl-, alkenyl- or alkaryl-substituted succinic acid or the corresponding anhydride formed from a mixture of maleic anhydride and alkyl-, alkenyl- and alkaryl-substituted hydrocarbon. Combination of (a) substituted succinic acid or the corresponding anhydride such as benzyl succinic acid, methylbenzyl succinic acid, dimethyl-benzyl succinic acid and 1-dodecenyl succinic acid or the corresponding anhydride with (b) unsaturated carboxylic acid and anhydride such as maleic anhydride and tetrahydrophthalic anhydride and (c) glycol such as ethylene glycol, diethylene glycol and propylene glycol, provides useful unsaturated polyester resin that reduce the volatility of styrene.

In accordance with this invention, unsaturated polyester resins are prepared by contacting under polycondensation conditions (a) at least one compound selected from (1) alkyl-, alkenyl- and alkaryl-substituted succinic anhydride having from about 7–10 carbon atoms per molecule, and (2) alkyl-, alkenyl- and alkaryl-substituted succinic acid, having from about 7–10 carbon atoms per molecule, (b) at least one unsaturated dicarboxylic acid or the corresponding anhydride having from about 4 to 10 carbon atoms per molecule and (c) at least one dialcohol having from about 2 to 10 carbon atoms per molecule. In an embodiment of the invention, a second dicarboxylic acid or the corresponding anhydride such as phthalic acid or phthalic ahydride is also present during the contacting.

In another embodiment, a mixture of styrene monomer and unsaturated polyester resins as prepared by the process of this invention is provided. In a further embodiment of this invention, cured polyesters are provided which have been prepared by heating of mixture of styrene monomer and unsaturated polyester resins of this invention under conditions to form resinous, normally solid, polyesters.

In a preferred embodiment maleic anhydride and xylene are reacted to form methyl benzylsuccinic acid, which is used in the preparation of the unsaturated polyester resin.

DETAILED DESCRIPTION OF THE INVENTION

Alkyl-, alkenyl- and alkaryl-substituted succinic acids and their anhydrides are prepared in good yield by reacting one equivalent of maleic anhydride with about 5 to about 20 equivalents of an alkyl-, alkenyl- and alkaryl-substituted hydrocarbon. Preferred hydrocarbons can be selected from toluene, pseudocumene, dodecene and xylenes. In the most preferred embodiment, xylene or 1-dodecene is utilized. The alkyl-, alkenyl- and alkaryl-substituted hydrocarbon acts as reactant and solvent.

A catalytic amount of a peroxide selected from benzoyl peroxide, lauryl peroxide, cumene hydroperoxide and di-t-butyl peroxide can also be present to initiate the reaction to form the succinic acid. The reaction to produce the succinic acid is carried out at a temperature ranging from about 100° C. to about 200° C. for a time of about 2 to about 16 hours. The succinic acid is then separated from the reaction mixture by a process such as extraction with aqueous bases. Acidification of the aqueous layer precipitates the product as the diacid.

In another embodiment of this invention substituted succinic anhydride is synthesized. This reaction can be carried out in the same reactor used for the subsequent preparation of polyester resin. Succinic anhydride adduct is prepared in a reactor using about 5 to about 20 equivalents of substituted hydrocarbon for each equivalent of maleic anhydride. Di-t-butyl peroxide or any other peroxide catalyst, substituted hydrocarbon and maleic anhydride are charged to a reactor. Upon being heated to a temperature in the range of about 120°–125° C. the stirred solution clouds and oily semi-solids separate. After refluxing for 2 to about 16 hours, during which such well known radical scavengers such as hydroquinone are present, a distillation of substituted succinic anhydride is produced which can be polymerized in the same reaction vessel by contact with maleic anhydride and propylene glycol, using standard unsaturated polyester synthesis techniques.

A typical reaction for forming the polyester resin utilizing the substituted succinic acid or anydride comprises contacting about 2 to about 3 equivalents of unsaturated dicarboxylic acid or anhydride with about 0.5 to about 1.5 equivalents of substituted succinic acid or anhydride and about 3 to about 4 equivalents of dihydric alcohol. This mixture is heated under a nitrogen atmosphere for removal of H₂O at a temperature in the range of 120° C. to about 190° C. for a time of about 4 to about 12 hours to yield polyester resin having an acid value in the range of about 10 to about 60.

Unsaturated polyester resin produced as set out above can be combined in a syrup composition with styrene monomer which, generally, will result in a syrup composition in which the styrene has a reduced tendency to volatilize. Generally such a mixture will comprise about 50% to about 20% styrene and about 50% to about 80% unsaturated polyester resin. Preferably about 40% to about 30% styrene and about 60% to about 70% resin will be used.

The following examples provide details for the specific invention.

EXAMPLE I

This example illustrates the synthesis of (1) substituted succinic acid and (2) substituted succinic anhydride to be used for making polyesters in accordance with the process of this invention.

(1) An aralkyl-substituted succinic acid (labeled Monomer A) was prepared by heating 103.2 grams (1.0 mole) of maleic anhydride and 1,000 grams (9.1 moles) of mixed xylenes (o, m and p-xylenes) in the presence of 10 grams of dibutyl peroxide, under reflux conditions (about 140°-145° C.) for about 6 hours in a round bottom flask. The reaction mixture was extracted with 800 mL of an aqueous solution containing 100 grams of NaOH. The extract solution was acidified with concentrated HCl to a pH of 2-3, and the acidified solution was extracted three times with 200 mL aliquots of ethyl acetate. The ethyl acetate extract was dried with magnesium sulfate, ethyl acetate was evaporated under reduced pressure conditions, and 185.9 of a yellow oil was recovered (crude yield: 86% of the theoretical yield). This yellow oil consisted substantially of methylbenzyl succinic acid (Monomer A) having the following structural formula:

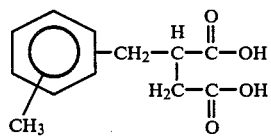

(2) An alkenyl-substituted succinic anhydride (labeled Monomer B) was prepared by heating 98.1 grams (1.0 mole) of maleic anhydride and 340 grams (1.35 mole) of 1-dodecene, in the presence of 5.5 grams of hydroquinone for about 6 hours at about 200° C. in a sealed, stirred 1-liter reactor. The cooled reactor was opened, and the yellow-brown solution was distilled under vacuum conditions (at about 5 torr) so as to produce, at a yield of about 66%, 1-dodecenyl succinic anhydride (Monomer B) having the following structural formula:

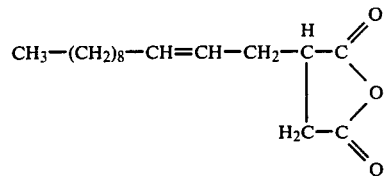

A portion of monomer B may have been hydrolyzed to the corresponding diacid.

EXAMPLE II

This example illustrates the preparation of two unsaturated polyesters utilizing Monomers A and B (described in Example I).

Polyester A was prepared by mixing 183 grams (0.8 mole) of Monomer A, 242.5 grams (2.5 moles) of maleic anhydride and 273.6 grams (3.6 moles) of propylene glycol, and then heating the mixture for about 2 hours at 140°-150° C. in a 1 liter glass reactor, under a nitrogen atmosphere. Thereafter, the temperature was raised to 170°-180° C., and the reaction mixture heated for 7.5 hours at this temperature, while formed water was removed. Finally, the temperature was increased to 180°-205° C., and heating continued for 3 more hours so as to attain Polyester A having an acid value of 57 (determined in accordance with ASTM procedure D2849).

0.08 grams of tolylhydroquinone antioxidant was added to the above reaction product (to decompose unreacted peroxides) at a temperature of about 160° C. When the temperature dropped to about 90° C., 225 grams of styrene was added so as to make 860 grams of a "polyester syrup" containing about 68 weight-% of Polyester A.

A polyester labeled Polyester A' was prepared substantially in accordance with procedure for Polyester A, except that the molar ratio of propylene glycol to maleic anhydride was about 1.8 (in lieu of 1.4). The reaction mixture containing Monomer A was heated for 8 hours at 150°-160° C. and then for 8 hours at 180°-210° C. 960 grams of wet Polyester A' resin (acid value: 31) was recovered. A second run yielded 955 grams of Polyester A' having an acid value of 32.

The two Polyester A' batches were mixed with 986 grams of styrene so as to make a polyester syrup containing about 66 weight-% of Polyester A'.

Polyester B was prepared by charging 5.32 grams (0.02 mole) of Monomer B, 146.5 grams (1.0 mole) of phthalic anhydride, 97 grams (1.0 mole) of maleic anhydride and 167.2 grams of (2.2 moles) of propylene glycol and then heating the mixture for 6 hours at 160°-170° C. and for 14 hours at 180°-200° C. under a nitrogen atmosphere. During this heating, the reaction mixture was stirred, and water was continuously removed. The reaction product having an acid number of 26 was mixed with 180 grams of styrene and 0.1 gram of tolylhydroquinone (THQ) so as to form 515 grams of a polyester syrup containing about 65 weight-% of Polyester B.

A polyester labeled Polyester B' was prepared substantially in accordance with the procedure described for Polyester B, using 0.1 mole of Monomer B, 0.95 mole of maleic anhydride, 0.95 mole of phthalic acid and 2.2 moles of propylene glycol. 37 mg of THQ antioxidant and 180 g of styrene were added to the reaction product at about 90° C. The polyester syrup contained 67 weight-% of Polyester B'.

Control Polyester C was a commercial polyester produced by Interplastics Corporation, Minneapolis, Minn., by polycondensation of about 1 mole of maleic anhydride, about 1 mole of phthalic anhydride and about 2.4 moles of propylene glycol. A styrene syrup of this resin also contained 65-70 weight-% Polyester C.

EXAMPLE III

This example illustrates the differences in styrene loss of polyester syrups (concentrated solutions in styrene as solvent) containing 65-70 weight-% of Polyesters A, A', B, B' and C. About 55 g of these polyester syrups were left 1 day in open containers under a fume hood. Weight losses due to styrene evaporation were:
Polyester A syrup 2.9%
Polyester A' Syrup 2.9%
Polyester B Syrup 2.3%
Polyester B' Syrup 2.8%
Polyester C Syrup 5.4%

These data clearly show that the invention polyesters (A, A', B, B') exhibited considerably reduced styrene losses from concentrated solution versus the commercial control Polyester C. This reduction in styrene losses will be beneficial both for cost and environmental reasons.

EXAMPLE IV

This example illustrates the mechanical properties of clear castings of polyesters described in Example II. ⅛ inch thick castings were made by curing polyester syrups (about 65 weight-% solutions of these polyesters dissolved in styrene) at room temperature, in the presence of 0.25 weight-% cobalt naphthenate (added as a 6 weight-% solution; available from Al-Dow Chemicals, Inc.,) and 0.5 weight-% of methylethyl ketone peroxide (Cadox M-50; Noury Chemical Corporation, Burt, NY) After 5 hours at room temperature, the cured resin samples were demolded and post-cured at 50° C. for 15-24 hours. The thus cured samples were then cut into test bars for mechanical testing. Pertinent mechanical properties are listed in Table I.

TABLE I

| Resin[6] | Polyester A (Invention) | Polyester A' (Invention) | Polyester B (Invention) | Polyester C (Control) |
|---|---|---|---|---|
| Flex Modulus[1], MPa | 2,990 | 2,460 | 3,650 | 4,090 |
| Flex Strength[1], MPa | 84 | 72 | 108 | 88 |
| Tensile Strength and Break[2], MPa | 51 | 58 | 44 | 51 |
| Elongation[2], % | 2 | 9[5] | 4 | 1.2 |
| Izod Impact, Notched, Joule/m | 40 | 39 | 39 | 32 |
| Heat Distortion[4], °C. | — | 58 | 63 | 68 |

[1]determined according to ASTM D 790
[2]determined according to ASTM D 638
[3]determined according to ASTM D 256
[4]determined according to ASTM D 648
[5]result is believed to be too high
[6]polymer B' was not tested Data in Table show that invention polyesters (A, A' and B) and control polyester C generally exhibited comparable mechanical properties. Izod impact and elongation of invention polyesters were consistently higher than those of control Polyester C.

We claim:

1. An unsaturated polyester resin prepared from (1) dialcohol having from about 2 to about 10 carbon atoms per molecule, (2) unsaturated dicarboxylic acid or dicarboxylic acid anhydride having from about 4 to about 10 carbon atoms per moledule and (3) at least one substituted succinic acid or substituted succinic anhydride selected from the group consisting of alkyl-, alkenyl- and alkaryl-substituted succinic acids and their anhydrides, having from about 7 to about 10 carbon atoms per molecule.

2. An unsaturated polyester resin according to claim 1 in which said substituted succinic acid or substituted succinic anhydride is selected from benzyl succinic acid, methylbenzyl succinic acid, dimethylbenzyl succinic acid and 1-dodecenyl succinic acid and the corresponding anhydrides.

3. An unsaturated polyester resin according to claim 1 in which said substituted succinic acid or anhydride is formed by contacting maleic anhydride and at least one alkyl-, alkenyl- and alkaryl-substituted hydrocarbon.

4. An unsaturated polyester resin according to claim 3 in which said hydrocarbon is selected from toluene, xylenes, 1-dodecene and pseudocumene.

5. A polyester resin syrup comprising styrene monomer and an unsaturated polyester resin of claim 1.

6. A polyester resin syrup according to claim 5 comprising about 20 weight percent to about 50 weight percent styrene and about 50 weight percent to about 80 weight percent of said polyester resin.

7. A process for preparing an unsaturated polyester resin comprising contacting under polycondensation conditions (1) at least one compound selected from the group consisting of (a) alkyl-, aleknyl- and alkaryl-substituted succinic acids having from about 7 to about 10 carbon atoms per molecule and (b) alkyl-, alkenyl- and alkaryl-substituted anhydrides having from about 7 to about 10 carbon atoms per molecule with (2) at least one unsaturated dicarboxylic acid or corresponding anhydrides having from about 3 to about 10 carbon atoms per molecule and (3) at least one dialcohol having from about 2 to about 10 carbon atoms per molecule.

8. A process according to claim 7 in which said substituted succinic acid and substituted succinic anhydride is selected from benzyl succinic acid, methylbenzyl succinic acid, dimethylbenzyl succinic acid and 1-dodecenyl succinic acid and the corresponding anhydrides.

9. A process according to claim 7 in which said unsaturated carboxylic acid or anhydride is selected from tetrahydrophthalic anhydride and maleic anhydride.

10. A process according to claim 7 in which said dialcohol is selected from ethylene glycol, diethylene glycol, and propylene glycol.

11. A process according to claim 7 in which a catalyst selected from benzoyl peroxide, lauryl peroxide, dibutyl peroxide and cumene hydro peroxide is present during said contacting.

12. A process according to claim 7 in which said contacting takes place at a temperature ranging from about 120° C. to about 190° C. for a period ranging from about 4 hours to about 12 hours.

13. A process for preparing a polyester resin syrup comprising admixing styrene monomer and an unsaturated polyester resin prepared by the method of claim 7.

14. A process of claim 13 in which styrene is present in an amount in a range of about 20 to about 50 weight percent and said polyester resin is present in an amount in a range of about 80 weight percent to about 50 weight percent.

15. A process for preparing a polyester resin syrup comprising admixing styrene monomer and an unsaturated polyester resin prepared by the method of claim 10.

16. A process of claim 15 in which styrene is present in an amount in a range of about 20 to about 50 weight percent and said polyester resin is present in an amount in a range of about 80 weight percent to about 50 weight percent.

17. A polyester resin group conprising styrene monomer and an unsaturated polyester resin of claim 4.

18. A polyester resin syrup according to claim 17 comprising about 20 weight percent to about 50 weight percent sytrene and about 80 weight percent to about 50 weight percent of said polyester resin.

19. A polyester resin syrup comprising styrene monomer and an unsaturated polyester resin made by the process of claim 7.

20. A polyester resin syrup of claim 19 in which styrene is present in an amount in a range of about 20 to about 50 weight percent and said polyester resin is present in an amount in a range of about 80 weight percent to about 50 weight percent.

* * * * *